United States Patent [19]

Sakurai et al.

[11] Patent Number: 4,506,053

[45] Date of Patent: Mar. 19, 1985

[54] ACETAL RESIN COMPOSITION

[75] Inventors: Masanori Sakurai; Junichi Miyawaki; Toshikazu Umemura; Toshikatsu Kawata; Shinzi Kiboshi, all of Toyonaka; Akiyoshi Shibata, Miki, all of Japan

[73] Assignee: Mitsubishi Gas Chemical Co., Inc., Tokyo, Japan

[21] Appl. No.: 559,028

[22] Filed: Dec. 7, 1983

[30] Foreign Application Priority Data

Dec. 7, 1982 [JP] Japan .................. 57-214530

[51] Int. Cl.$^3$ .................. C08K 3/22; C08K 3/34; C08K 3/30; C08L 59/02

[52] U.S. Cl. .................. 524/405; 524/413; 524/420; 524/425; 524/430; 524/593; 524/597; 525/398; 525/400; 525/427; 525/441; 525/472

[58] Field of Search ............ 524/405, 413, 420, 430, 524/425, 593, 597; 525/398, 400, 472, 441, 427

[56] References Cited

U.S. PATENT DOCUMENTS

| 3,455,867 | 7/1969 | Berardinelli et al. | 524/196 |
|---|---|---|---|
| 3,647,743 | 3/1972 | Nagamatsu et al. | 524/612 |
| 3,670,050 | 6/1972 | Castner et al. | 524/593 |
| 3,689,593 | 9/1972 | Jackson | 524/474 |
| 3,901,846 | 8/1975 | Freed | 524/593 |
| 3,969,292 | 7/1976 | Wolters et al. | 524/593 |
| 4,111,887 | 9/1978 | Shaner et al. | 524/500 |
| 4,139,575 | 2/1979 | Amann et al. | 525/414 |
| 4,195,132 | 3/1980 | Sundermann et al. | 525/398 |
| 4,243,580 | 1/1981 | Gale | 524/227 |
| 4,342,680 | 8/1982 | Sugio et al. | 524/493 |
| 4,373,086 | 2/1983 | Ikeguchi | 525/422 |
| 4,386,178 | 5/1983 | Schuette et al. | 524/542 |
| 4,394,468 | 7/1983 | Lu | 524/502 |
| 4,427,807 | 1/1984 | Zimmerman et al. | 524/542 |
| 4,469,859 | 9/1984 | Gaku et al. | 525/422 |

OTHER PUBLICATIONS

Derwent Abstract 68988 D/38 (Aug. 1981) J56098162, Mitsubishi Gas Chem.
Derwent Abstract, 46619 E/23, (Dec. 1981) J56157426, Mitsubishi Gas Chem.
Chem. Abstracts, 99-196064k, (1983), Jun. 11, 1983, (JP5898356).

Primary Examiner—Herbert J. Lilling
Attorney, Agent, or Firm—Wenderoth, Lind & Ponack

[57] ABSTRACT

An acetal resin composition comprising
(A) an acetal resin,
(B) at least one member selected from the group consisting of (1) a polyfunctional cyanic acid ester or its prepolymer, (2) a mixture of a polyfunctional cyanic acid ester or its prepolymer with a polyfunctional maleimide or its prepolymer and (3) a pre-copolymer of a polyfunctional cyanic acid ester and a polyfunctional maleimide,
(C) an amine-substituted triazine and/or a cyanoguanidine compound, and
(D) an inorganic filler other than glass, and/or an organic filler.

15 Claims, No Drawings

ACETAL RESIN COMPOSITION

This invention relates to a novel acetal resin composition, and more specifically, to an acetal resin composition in which the adhesion between the acetal resin and various organic or inorganic fillers is excellent.

Various inorganic filler materials and/or organic filler materials have been incorporated in thermosetting or thermoplastic resins. The purpose of incorporating filler materials is to improve dynamical properties such as rigid strength, hardness, friction resistance and wear resistance, increase heat distortion temperature, impart fire retardancy, increase the dimensional accuracy of molded articles by the decreasing of their shrinkage, improve electrical conductivity and antistatic property, and to increase economy by using inexpensive fillers.

In the case of acetal resins, it has also been the previous practice to fill them with glass fibers, glass powders, carbon powders, carbon fibers, molybdenum disulfide, potassium titanate fibers, potassium metasilicate fibers, Teflon, etc. (Japanese Patent Publications Nos. 28191/1969, 25181/1970, 45941/1981 and 7615/1964).

Attempts have also been made to fill acetal resins with powders or fibers or metals such as aluminum, zinc, bronze, iron, lead, nickel, brass, silver, gold, antimony, bismuth and tin, silica, alumina, talc, calcium carbonate (Japanese Patent Publication No. 25181/1970 and 25184/1970).

Mere mixing of an acetal resin with these fillers is not effective, and may rather result in a reduction in mechanical strength or a marked deterioration in heat stability and give a composition that is useless in practical applications.

To overcome this disadvantage, methods were proposed which comprise coating these inorganic or organic filler materials with a phenoxy resin, polyamide, polyurea, polystyrene, polyvinyl pyrrolidone, polyurethan, etc., and blending the coated filler materials with an acetal resin (Japanese Patent Publications Nos. 18741/1980, 31744/1971, 1463/1974 and 2974/1974).

It was also proposed to use isocyanates, polycarbodiimide, alkoxymethylmelamines, etc. when an acetal resin is filled with glass fibers or glass powders (Japanese Patent Publication No. 25259/1971, and Japanese Laid-Open Patent Publications Nos. 81557/1978 and 157645/1980).

However, the method involving blending the coated filler materials is expensive when practiced on an industrial scale, and the increase of mechanical strength achieved thereby is small. Isocyanates, carbodiimide or alkoxymethylmelamines are effective as coupling agents for glass fibers or glass powders, but show little or no effect for the other filler materials.

It is an object of this invention to provide a novel acetal resin composition.

Another object of this invention is to provide a novel acetal resin composition comprising various organic or inorganic fillers having an excellent adhesion to an acetal resin.

Still another object of this invention is to provide a filler-containing acetal resin composition in which the effects of various organic or inorganic fillers are exhibited to the fullest extent.

Further objects and advantages of this invention will become apparent from the following description.

According to this invention, the above objects and advantages are achieved by an acetal resin composition comprising:

(A) an acetal resin, (B) at least one member selected from the group consisting of (1) a polyfunctional cyanic acid ester or its prepolymer, (2) a mixture of a polyfunctional cyanic acid ester or its prepolymer with a polyfunctional maleimide or its prepolymer and (3) a pre-copolymer of a polyfunctional cyanic acid ester and a polyfunctional maleimide, (C) an amine-substituted triazine and/or a cyanoguanidine compound, and (D) an inorganic filler other than glass and/or an organic filler.

The acetal resin (A) used in the present invention may be a homopolymer or copolymer containing oxymethylene units. Preferably, it is composed mainly (at least 50 mole% of the recurring units) of oxymethylene units, or are composed substantially of oxymethylene units and oxyalkylene units having at least 2, preferably 2 to 9, carbon atoms. Especially preferably, it is composed substantially of oxymethylene units, or contains not more than 40 mole% (preferably not more than 10 mole%) of oxyalkylene units having at least 2 carbon atoms and are composed substantially of oxymethylene units and the oxyalkylene units having at least 2 carbon atoms.

The acetal resin can be produced, for example, by using a formaldehyde monomer or a cyclic oligomer thereof such as its trimer (trioxane) or its tetramer (tetroxane) as a starting material in which case an oxymethylene homopolymer composed substantially of only oxymethylene units is obtained, or by using the aforesaid material and a cyclic ether such as ethylene oxide, propylene oxide, epichlorohydrin, 1,3-dioxolane, 1,3-dioxepane, a formal of a glycol or a formal of a diglycol in which case an oxymethylene copolymer composed of oxymethylene units and oxyalkylene units having at least 2 carbon atoms is obtained.

Methods for producing the acetal resin are well known in the art.

The polyfunctional cyanic acid ester or its prepolymer used in the composition of this invention denotes a polycyanic acid ester having at least two cyanate ester groups in the molecule or its prepolymer.

A preferred example of the polycyanic acid ester is a compound represented by the following formula (1)

$$R_1-O-C\equiv N)_m \tag{1}$$

wherein $R_1$ represents an aromatic organic group having a valence of m, the cyanate ester group ($-O-C\equiv N$) is bonded directly to the aromatic ring of the group $R_1$, and m represents an integer of at least 2.

In formula (1), m is an integer of at least 2, preferably an integer of 2 to 10. $R_1$ is an aromatic organic group having a valence of m, for example (a) a residue of a monocyclic or fused aromatic hydrocarbon having 6 to 16 carbon atoms, for example benzene, naphthalene, anthracene and pyrene, (b) a residue of a polycyclic aromatic hydrocarbon formed by direct bonding of a plurality of benzene rings typified by biphenyl, (c) a polycyclic aromatic group represented by the following formula (5) resulting from linking of a plurality of benzene rings through a bridging portion

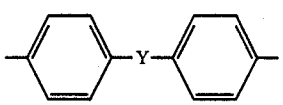

(5)

wherein Y represents a divalent bridging group, for example a linear, branched or cyclic aliphatic hydrocarbon group having 1 to 14 carbon atoms, an aromatic hydrocarbon group typified by a phenylene or xylylene group, an oxygen atom, a sulfur atom, a carbonyl group, a sulfonyl group, a sulfinyl group, a phosphonyl group, a phosphinyl group, an imino group, or an alkyleneoxyalkylene group, for example a group corresponding to a compound in which the skeleton of formula (5) is a diphenylalkane such as diphenylmethane or 2,2-diphenylpropane, diphenyl ether, diphenyl dimethylene ether, diphenyl thioether, diphenyl ketone, diphenylamine, diphenyl sulfoxide, diphenylsulfone, triphenyl phosphite or triphenyl phosphate, preferably the diphenylalkane, among all 2,2-diphenylpropane, and (d) a residue of a polycyclic product of benzene (usually, with 10 or less rings) which is an initial condensation product of phenol and formaldehyde.

The aromatic ring of the m-valent organic group may be substituted by an inert substituent such as an alkyl group or an alkoxy group, prefetably an alkyl or alkoxy group having 1 to 6 carbon atoms.

The polycyanic acid ester represented by general formula (1) is generally prepared by a known method of reacting the corresponding polyhydric phenolic compound with a cyanogen halide. Divalent cyanate esters derived from dihydric phenols such as 2,2-bis(4-hydroxyphenyl)propane (i.e., bisphenol A), or polyisocyanate compounds obtained by reacting an initial condensate of phenol and formaldehyde with a cyanogen halide are especially preferably used because they are easily available and give good properties to the final resin composition.

The compound (1) in component (B) of the composition of this invention may be used as a polycyanic acid ester, or an oligomer (prepolymer) derived from the polycyanic acid ester, or as a mixture of these. The prepolymer may be a pre-copolymer derived from two or more polycyanic acid esters.

The aforesaid prepolymer can be produced by heating the polycyanic acid ester in the absence of a catalyst, or by polymerizing it in the presence of a catalyst, for example a mineral acid, a Lewis acid, a salt such as sodium carbonate or lithium chloride, or a phosporic acid ester such as tributylphosphine. These prepolymers contain a sym-triazine ring formed by the trimerization of the cyano group in the cyanate ester, and preferably having a weight average molecular weight of about 400 to about 6,000. For example, a commercially available "cyanate resin" is a mixture of 2,2-bis(4-cyanatophenyl)propane obtained from bisphenol A and a cyanogen halide with its prepolymer. This "cyanate resin" can be suitably used in the present invention.

The polyfunctional maleimide used in components (2) and (3) of the component (B) denotes a polymaleimide having at least two maleimido groups in the molecule.

Examples of preferred polymaleimides are compounds represented by the following formula (2)

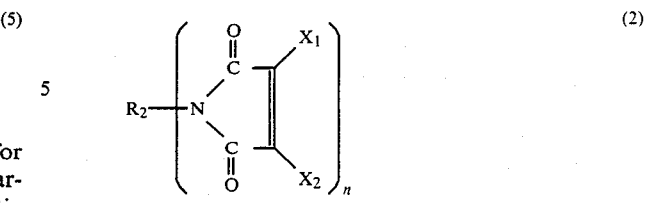

(2)

wherein $R_2$ represents an aromatic or aliphatic organic group having a valence of n, $X_1$ and $X_2$ each represent a hydrogen atom, a halogen atom or a lower alkyl group, and n represents an integer of at least 2.

In formula (2), n is an integer of at least 2, preferably an integer of 2 to 10, and $R_2$ is an aromatic or aliphatic organic group having a valence defined by n.

Examples of the organic group $R_2$ include (a) linear or cyclic aliphatic hydrocarbon groups having 4 to 16 carbon atoms, (b) monocyclic or fused aromatic hydrocarbon groups having a benzene or naphthalene ring such as a phenylene, naphthylene or xylylene group, (c) polycyclic aromatic hydrocarbon groups formed by direct bonding of a plurality of benzene rings, typified by a biphenyl group; (d) polycyclic aromatic groups represented by formula (5) given hereinabove resulting from linking of a plurality of benzene rings through a bridging portion, (e) a melamine residue, and (f) a residue of a polynuclear product of benzene (usually with 10 or less rings) obtained by reacting aniline with formaldehyde. These n-valent organic groups may be substituted by an inert substituent such as an alkyl or alkoxy group, preferably an alkyl or alkoxy group having 1 to 6 carbon atoms.

In the present invention, the polyfunctional maleimide may also be used as a prepolymer.

The polyfunctional maleimide can be produced generally by a known method of reacting the corresponding polyamino compound with maleic anhydride. In the present invention, the polyfunctional maleimide is preferably a compound of formula (2) in which $R_2$ is the polycyclic aromatic group (d), for example a bismaleimide from 4,4'-bisaminophenylmethane and maleic anhydride.

The prepolymer of the polyfunctional maleimide may be a pre-copolymer derived from two or more polyfunctional maleimides.

The prepolymer can be produced by a known method, for example by heating the polyfunctional maleimide in the absence of a catalyst. Preferably, the prepolymer has a weight average molecular weight of about 600 to about 9,000.

In the present invention, the polyfunctional maleimide or its prepolymer is used as a mixture with the aforesaid polyfunctional cyanic acid ester or its prepolymer. Preferably, the mixture may contain not more than 90% by weight, especially not more than 80% by weight, based on the entire mixture, of the polyfunctional maleimide or its prepolymer.

In the present invention, a pre-copolymer of the polyfunctional cyanic acid ester and the polyfunctional maleimide may also be used as the component (B). The precopolymer may be produced in the seam way as in the preparation of the prepolymer of the polyfunctional maleimide described above. Preferably, the precopolymer may contain not more than 90% by weight, especially not more than 80% by weight, of units derived from the polyfunctional maleimide. Preferably, the pre-copolymer has a weight average molecular weight of about 400 to 9,000.

This pre-copolymer is a liquid product having an unexpectedly low viscosity. By using this prepolymer, the resin composition of this invention can be very easily prepared, and the use of this pre-copolymer is also advantageous in handling and processing in various applications of the resin composition. The embodiment of this invention involving the use of the aforesaid precopolymer is preferred for practical applications.

One preferred example of the amine-substituted triazine used in this invention is a compound represented by the following formula (3)

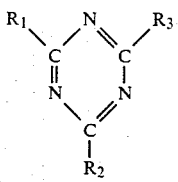
(3)

wherein $R_1$, $R_2$ and $R_3$ are identical or different, and each represents a hydrogen atom, a halogen atom, a hydroxyl group, an alkyl group, an alkoxy group, an aryl group, an arylalkyloxy group or a substituted or unsubstituted amino group, provided that at least one of $R_1$, $R_2$ and $R_3$ is a substituted or unsubstituted amino group.

The halogen atom, is for example, chlorine or bromine, preferably chlorine.

Examples of the alkyl group are those having 1 to 6 carbon atoms, preferably 1 to 4 carbon atoms.

Examples of the alkoxy group are those having 1 to 6 carbon atoms, preferably 1 to 4 carbon atoms.

A phenyl group is preferred as the aryl group, and phenylalkyloxy groups, especially benzyloxy or phenylethyloxy groups, are preferred as the arylalkyloxy group.

Examples of the substituent on the substituted amino group include lower alkyl groups having 1 to 6 carbon atoms such as methyl, ethyl, butyl or hexyl, a phenyl group, lower alkenyl groups having 3 to 6 carbon atoms such as allyl or hexenyl, hydroxyalkyl groups having 1 or 2 carbon atoms such as hydroxymethyl or hydroxyethyl, and cyanoalkyl groups having 3 to 6 carbon atoms such as cyanoethyl or cyanobutyl.

Examples of the amine-substituted triazine include guanamine (i.e., 2,4-diamino-sym-triazine), melamine (i.e., 2,4,6-triamino-sym-triazine), 2,4-diamino-6-chloro-sym-triazine, N-butylmelamine, N-phenylmelamine, N,N'-diphenylmelamine, N,N-diallylmelamine, N,N',N''-triphenylmelamine, N-monomethylolmelamine, N,N'-dimethylolmelamine, N,N', N''-trimethylolmelamine, benzoguanamine (i.e., 2,4-diamino-6-phenyl-sym-triazine), 2,4-diamino-6-methyl-sym-triazine, 2,4-diamino-6-butyl-sym-triazine, 2,4-diamino-6-methoxy-sym-triazine, 2,4-diamino-6-benzyloxy-sym-triazine, 2,4-dihydroxy-6-amino-sym-triazine (i.e., ammelide), 2-hydroxy-4,6-diamino-sym-triazine (i.e., ammeline), and N,N,N',N'-tetracyanoethylbenzoguanamine. Of these, melamine, guanamine, benzoguanamine, N-monomethylolmelamine, N,N'-dimethylolmelamine and N,N',N''-trimethylolmelamine are especially preferred.

Examples of preferred cyanoguanidine compounds that can be used in this invention are those represented by the following formula (4)

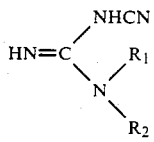
(4)

wherein $R_1$ and $R_2$ are identical or different and each represents a hydrogen atom, an alkyl group, a hydroxyalkyl group or an aryl group.

In formula (4), the alkyl and hydroxyalkyl groups have 1 to 6 carbon atoms for example, preferably 1 to 3 carbon atoms.

Specific examples of the cyanoguanidine compounds include cyanoguanidine, 1-cyano-3-methylguanidine, 1-cyano-3-ethylguanidine, 1-cyano-3-isopropylguanidine, 1-cyano-3,3-diphenylguanidine, 1-cyano-3-hydroxymethylguanidine, and 1-cyano-3-(2-hydroxyethyl)guanidine. Of these, cyanoguanidine is most preferred.

The inorganic or organic filler used in this invention may, for example, be in the form of a powder, flakes or fibers. The glass filler is not included in the inorganic or organic fillers used in this invention. Examples of the inorganic filler include metals, metal oxides, metal hydroxides, metal sulfates, metal sulfides, metal silicates (excluding glass), metal borates, potassium titanate, carbon and graphite. Examples of the metals are iron, copper, aluminum, lead, zinc, bronze, gold and silver. Short metal fibers produced by utilizing chattering vibraiton in cutting are especially preferably used as the filler. Examples of the metal oxides are silica, diatomaceous earth, alumina, titanium oxide, iron oxide, zinc oxide, antimony oxide, magnesium oxide, beryllium oxide, pumice, barium ferrite and strontium ferrite. Examples of the metal hydroxides are aluminum hydroxide and magnesium hydroxide. Examples of the metal carbonates are calcium carbonate, magnesium carbonate, dolomite, and dawsonite. Examples of the metal sulfates are calcium sulfate, barium sulfate and ammonium sulfate. Examples of the metal silicates are talc, clay, mica, asbestos, calcium silicate, montmorillonite and bentonite. Borates such as zinc borate and barium metaborate, metal sulfides such as molybdenum disulfide, potassium tetratitanate and potassium hexatitanate can also be used. The composition of this invention containing carbon black, graphite or carbon fibers as the filler has especially good weatherability, electrical conductivity, electromagnetic shielding property, abrasion resistance and rigidity.

Examples of the organic filler are aromatic polyester fibers, aromatic polyamide fibers, and aromatic polyimide fibers.

Fibers of organic polymers having an amido group, an imide group, an amino group or a hydroxyl group in the molecular chains are especially useful as reinforcing materials for acetal resins.

Prior to blending with the acetal resin, these inorganic or organic fillers may be treated with a silane treating agent or an organic titanate. For example, silica, alumina or titanium oxide having a hydroxyl group on the surface, when treated with aminosilane, vinylsilane, epoxy silane, etc., imparts especially good reinforcing effects to the acetal resin. Such a silane treating agent or an azidosilane coupling agent is also effective for dolomite, dawsonite, talc, clay, mica, asbestos, bentonite, potassium titanate, or metals such as aluminum flakes. Silane treatment, however, is not so effective for the metal carbonates and sulfates. But when the surfaces of these materials are first treated with water glass and then with the silane treating agent, the effect of the silane treatment is produced. The general practice is to use such carbonates and sulfates after coating with metal salts, esters, amides, etc. of various fatty acids. Surface treatment with organic titanates or silanes is not particularly advantageous when applied to carbon, carbon fibers and graphite.

Treatment with silanes or organic titanates is neither advantageous on organic polymers having an amido group, an imide group, an amino group, or a hydroxyl group in the molecular chains. The inorganic or organic fibrous fillers used in this invention may be those which are bundled by using epoxy resins, polyurethan resins, polyvinyl alcohol, acrylate resins, polystyrene resin, etc. as a bundling agent.

The characteristic of the resin composition of this invention is that is contains the aforesaid four components (A) to (D).

For example, when the component (B) is omitted and the amine-substituted triazine and/or cyanoguanidine compound (C) is used as a coupling agent for the acetal resin (A) and the inorganic and/or organic filler (D), the reinforcing effect is low and no increase in mechanical strength can be expected. However, when the amine-substituted triazine and/or cyanoguanidine compound (C) and the component (B) which is either (1) the polyfunctional cyanic acid ester or its prepolymer, (2) the mixture of the polyfunctional cyanic acid ester or its prepolymer and the polyfunctional maleimide or its prepolymer, or (3) the pre-copolymer of the polyfunctional cyanic acid ester and the polyfunctional maleimide are used together as a coupling agent for the inorganic and/or organic filler (D) and the acetal resin (A), the reinforcing effect of the filler (D) is great, and a resin composition (molding material) having excellent heat stability can be obtained.

It has been found that the coupling agent in accordance with this invention composed of the components (B) and (C) makes possible the filling of an inorganic fillers such as metals, metal fibers, talc, silica and mica in high concentrations which has heretofore been considered difficult, and particularly since this coupling agent imparts a great adhesive effect to potassium titanate fibers and carbon fibers, a composite material having high rigidity can be obtained. Furthermore, the reinforcing material in accordance with this invention has reduced discoloration by heat or a reduced tendency to contaminate a mold during a molding operation, and lends itself to very good handling.

Preferably, the resin composition of this invention contains 0.1 to 20 parts by weight of the component (B), 0.1 to 20 parts by weight of the component (C) and 0.1 to 120 parts by weight of the inorganic filler and/or the organic filler (D) per 100 parts by weight of the acetal resin (A).

As required, known heat stabilizers, light stabilizers, antioxidants, etc. may be incorporated in the composition of this invention in amounts which do not adversely affect the effects of this invention.

Generally, the acetal resin composition of this invention can be produced by a method which comprises dry-blending all of the components (A) to (D) together, and then melting and kneading them. There can also be used a method which comprises kneading the component (D) with a melt-kneaded mixture of the components (A) to (C).

Melt-kneading can be carried out in various devices, for example various extruders, and general kneaders such as kneaders, Banbury mixers, and mixing rolls. Preferably, before the kneading operation, the individual components are dry-blended, and fed to such a device.

The suitable melt-kneading temperature is 180° to 240° C.

The following Examples and Comparative Examples illustrate the present invention more specifically. In these examples, the various properties were measured by the following methods.

MI value: ASTM D-1238.
Tensile strength and tensile elongation: ASTM D-638.
Flexural strength and flexural modulus: ASTM D-790.
Hunter color difference: JIS Z-8722 (by means of an instrument available under Model SM-3 made by Suga Testing Machine Co., Ltd.)

EXAMPLE 1 AND COMPARATIVE EXAMPLES 1 and 2

4.0 kg of an acetal copolymer containing 2.8% by weight of comonomer units derived from ethylene oxide and having an MI value of 9,5 (Iupital F20-01, a tradename for a product of Mitsubishi Gas Chemical Co., Inc.), 20 g of 2,2-bis(4-cyanatophenyl)propane, 20 g of melamine and 1.0 kg of PAN-type carbon fibers (chopped strand) were mixed for 3 minutes in a tumbler-type blender. The mixture was fed into a single-screw extruder with a screw diameter of 40 mm and kneaded and extruded at a resin temperature of 220° C.

The resulting acetal resin composition containing the carbon fibers was injection-molded at a resin temperature of 210° C., an injection pressure of 800 kg/cm$^2$ and a die temperature of 80° C. The tensile strength, tensile elongation, flexural strength and flexural modulus of the molded article were measured. The results are shown in Table 1.

For comparison, the above procedure was repeated except that melamine was not used and 2,2-bis(4-cyanatophenyl)propane was used alone (Comparative Example 1), or that 2,2-bis(4-cyanatophenyl)propane was not used and melamine was used alone (Comparative Example 2). The results are also shown in Table 1.

TABLE 1

|  | Example 1 | Comparative Example 1 | Comparative Example 2 |
| --- | --- | --- | --- |
| Composition |  |  |  |
| Acetal resin (kg) | 4.0 | 4.0 | 4.0 |
| 2,2-bis(4-cyanatophenyl)propane (g) | 20 | 20 | 0 |
| Melamine (g) | 20 | 0 | 20 |
| Carbon fibers (kg) | 1.0 | 1.0 | 1.0 |
| Properties |  |  |  |
| Tensile strength (kg/cm$^2$) | 1650 | 1362 | 957 |
| Tensile elongation (%) | 3 | 3 | 3 |
| Flexural strength (kg/cm$^2$) | 2680 | 2096 | 1412 |
| Flexural modulus (kg/cm$^2$) | 141,000 | 115,000 | 86,000 |

EXAMPLES 2 to 5 AND COMPARATIVE EXAMPLES 3 and 4

In each run, an aluminum flake-reinforced acetal resin composition was produced in the same way as in Example 1 except that a mixture of 1 part by weight of 2,2-bis(4-cyanatophenyl)propane and 1 part by weight of bismaleimide prepared from maleic anhydride and 4,4'-bisaminophenylmethane was used as the component (B), each of the various amino-substituted triazines or cyanoguanidines shown in Table 2 was used as the component (C), and aluminum flake (K-152, a product of Transmet Corporation) as the component (D). The tensile strength of the resin composition is shown in Table 2.

molded in the same way as in Example 1 and its tensile strength and tensile impact strength were measured.

Comparative Examples 5 to 18 were carried out in the same way as in Examples 6 to 19 respectively except that the coupling agent was not used. The results are also shown in Table 3.

In the compositions of this invention, the strength of adhesion between the filler material and the acetal resin was high, and they showed excellent properties as composite materials.

TABLE 3

| Example | 6 | 7 | 8 | 9 | 10 | 11 | 12 | 13 | 14 | 15 | 16 | 17 | 18 | 19 |
|---|---|---|---|---|---|---|---|---|---|---|---|---|---|---|
| Composition | | | | | | | | | | | | | | |
| Acetal resin (kg) | 4.0 | 4.0 | 4.0 | 4.0 | 4.0 | 4.0 | 4.0 | 4.0 | 4.0 | 5.0 | 5.0 | 4.0 | 4.0 | 4.0 |
| 2,2-bis(4-cyanatophenyl)propane (g) | 20 | 30 | 20 | 50 | 20 | 30 | 30 | 20 | 20 | 25 | 25 | 20 | 20 | 20 |
| N,N—dimethylolmelamine (g) | 20 | 20 | 20 | 30 | 20 | 20 | 20 | 20 | 30 | 30 | 30 | 25 | 25 | 25 |
| Inorganic filler Kind | (a) | (b) | (c) | (d) | (e) | (f) | (g) | (h) | (i) | (j) | (k) | (l) | (m) | (n) |
| Inorganic filler Amount (kg) | 1.0 | 1.0 | 1.0 | 1.0 | 0.4 | 1.0 | 1.0 | 1.0 | 0.7 | 2.14 | 2.14 | 1.0 | 1.0 | 1.0 |
| Properties | | | | | | | | | | | | | | |
| Tensile strength (kg/cm$^2$) | 875 | 865 | 972 | 635 | 615 | 785 | 886 | 619 | 605 | 626 | 663 | 595 | 495 | 593 |
| Tensile impact strength (kg-cm/cm$^2$) | 86 | 95 | 115 | 68 | 65 | 65 | 91 | 85 | 68 | 68 | 70 | 65 | 63 | 70 |
| Comparative Example | 5 | 6 | 7 | 8 | 9 | 10 | 11 | 12 | 13 | 14 | 15 | 16 | 17 | 18 |
| Properties | | | | | | | | | | | | | | |
| Tensile strength (kg/cm$^2$) | 405 | 525 | 720 | 403 | 493 | 530 | 546 | 526 | 485 | 427 | 465 | 535 | 427 | 553 |
| Tensile impact strength (kg-cm/cm$^2$) | 53 | 63 | 55 | 45 | 45 | 50 | 50 | 62 | 48 | 55 | 52 | 48 | 45 | 47 |

Note to Table 3
(1) The tensile impact strength was measured by using a sample (1/16 inch, S-type).
(2) The inorganic fillers shown by letters in the table were as follows:-
(a) Mica*
(b) Aluminum fibers (obtained by cutting using chattering vibration; a product of Aisin Seiki Co., Ltd.)
(c) Potassium hexatitanate fibers (TISMO D-101, a product of Otsuka Chemical Co., Ltd.)
(d) Silica*
(e) Carbon black
(f) Needlelike calcium metasilicate*
(g) Dawsonite fibers*
(h) Zinc oxide*
(i) Magnesium hydroxide*
(j) Calcium carbonate (St101 made by Shiraishi Calcium Co., Ltd.)*
(k) Kaolin**
(l) Molybdenum disulfide**
(m) Anhydrous sodium tetraborate**
(n) Barium sulfate**

Comparative Example 3 was carried out in the same way as above except that known diphenylmethane diisocyanate was used as the coupling agent. Comparative Example 4 was carried out in the same way as above except that no coupling agent was used. The results are also shown in Table 2.

The materials with one asterisk were those surface-treated with γ-aminopropyltrimethoxysilane, and the materials with two asterisks were those treated with 1% by weight of γ-aminopropyltrimethoxysilane and 1% by weight of polyethoxydimethylsiloxane.

TABLE 2

| | Example 2 | Example 3 | Example 4 | Example 5 | Comparative Example 3 | Comparative Example 4 |
|---|---|---|---|---|---|---|
| Composition | | | | | | |
| Acetal resin (kg) | 3.0 | 3.0 | 3.0 | 3.0 | 3.0 | 3.0 |
| Component (B) (g) | 30 | 30 | 30 | 30 | 50 (diphenylmethane diisocyanate) | None |
| Component (C) (g) | Benzoguanamine | N,N',N''—trimethylolmelamine | Cyanoguanidine | 1-Cyano-3-ethylguanidine | None | None |
| | 20 | 20 | 20 | 20 | | |
| Aluminum flake (kg) | 1.0 | 1.0 | 1.0 | 1.0 | 1.0 | 1.0 |
| Tensile strength (kg/cm$^2$) | 750 | 762 | 685 | 653 | 487 | 385 |

EXAMPLES 6 to 19 AND COMPARATIVE EXAMPLES 5 to 18

In each run, an acetal resin composition was prepared in the same way as in Example 1 except that each of the various inorganic fillers described in Table 3 was used instead of the carbon fibers, and 2,2-bis(4-cyanatophenyl)propane and N,N'-dimethylolmelamine were used as the coupling agent. The composition was EXAMPLES 20 to 22 AND COMPARATIVE EXAMPLES 19 to 21

In each run, an acetal resin composition was prepared in the same way as in Example 1 except that an acetal homopolymer (TENAC 5010, a product of Asahi Chemical Industry Co., Ltd.) was used as the component (A), a prepolymer of 2 parts by weight of 2,2-bis(4-cyanatophenyl)propane and 2 parts of bismaleimide obtained from 1 part by weight of maleic anhydride and 1 part by weight of 4,4-bisaminophenylmethane was used as the component (B), melamine was used as the component (C), and each of the organic fillers indicated in Table 4 was used as the component (D). The prepolymer mentioned above had a weight average molecular weight of 2,000 to 2,500 and contained a sym-triazine ring formed by the trimerization of the cyano group of the cyanate ester in the molecule.

The composition was molded in the same way as in Example 1 and its tensile strength was examined. The results are shown in Table 4.

Comparative Examples 19 to 21 were carried out in the same way as in Examples 20 to 22 respectively except that melamine and the prepolymer of 2,2-bis(4-cyanatophenyl)propane and bismaleimide were not used. The results are also shown in Table 4.

TABLE 4

| Example | 20 | 21 | 22 |
|---|---|---|---|
| Composition | | | |
| Acetal resin (kg) | 4.0 | 4.0 | 4.0 |
| Prepolymer (g) | 20 | 20 | 20 |
| Melamine (g) | 20 | 20 | 20 |
| Organic filler (kg) | Aromatic polyamide* 0.4 | Aromatic polyester** 0.4 | Aromatic polyimide*** 0.4 |
| Tensile strength (kg/cm²) | 1150 | 845 | 863 |
| Comparative Example | 19 | 20 | 21 |
| Tensile strength (kg/cm²) | 850 | 670 | 680 |

*KEVLAR 29, a product of E. I. du Pont de Nemours & Co.
**Cebnex 2010, a product of Celanese Corporation
***Kapton-200F, a product of E. I. du Pont de Nemours & Co.

What is claimed is:

1. An acetal resin composition comprising
   (A) an acetal resin which is a homopolymer or copolymer containing oxymethylene units,
   (B) at least one member selected from the group consisting of (1) a polyfunctional cyanic acid ester or its prepolymer, (2) a mixture of a polyfunctional cyanic acid ester or its prepolymer with a polyfunctional maleimide or its prepolymer and (3) a pre-copolymer of a polyfunctional cyanic acid ester and a polyfunctional maleimide,
   (C) an amine-substituted triazine and/or a cyanoguanidine compound, and
   (D) an inorganic filler other than glass, and/or an organic filler.

2. The composition of claim 1 wherein the acetal resin (A) is composed mainly of oxymethylene units.

3. The composition of claim 1 wherein the acetal resin (A) is composed substantially of oxymethylene units.

4. The composition of claim 1 wherein the acetal resin (A) is composed substantially of oxymethylene units and oxyalkylene units having at least 2 carbon atoms.

5. The composition of claim 1 wherein the polyfunctional cyanic acid ester or its prepolymer is a compound represented by the following formula

R₁—O—C≡N)ₘ wherein R₁ represents an aromatic organic group having a valence of m, the cyanate group —O—C≡N is bonded directly to the aromatic ring of the organic group R₁, and m is an integer of 2 or more, or its prepolymer.

6. The composition of claim 1 wherein the polyfunctional maleimide or its prepolymer is a compound represented by the following formula

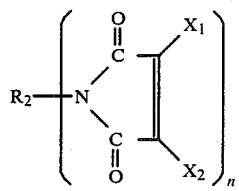

wherein R₂ represents an aromatic or aliphatic organic group having a valence of n, each of X₁X₂ represents a hydrogen atom, a halogen atom or a lower alkyl group, and n represents an integer of 2 or more, or its prepolymer.

7. The composition of claim 1 wherein the precopolymer of the polyfunctional cyanic acid ester and the polyfunctional maleimide is a prepolymer of the compound of the formula in claim 5 and the compound of the formula in claim 6.

8. The composition of claim 1 wherein the aminesubstituted triazine is a compound represented by the following formula

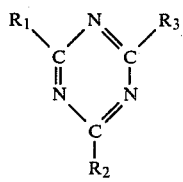

wherein R₁, R₂ and R₃ are identical or different and each represents a hydrogen atom, a halogen atom, a hydroxyl group, an alkyl group, an alkoxy group, an aryl group, an arylalkyloxy group, or a substituted or unsubstituted amino group, provided that at least one of R₁, R₂ and R₃ is a substituted or unsubstituted amino groups.

9. The composition of claim 1 wherein the cyanoguanidine compound is a compound represented by the following formula

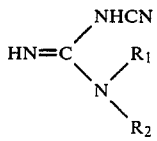

wherein R₁ and R₂ are identical or different, and each represents a hydrogen atom, an alkyl group, a hydroxyalkyl group or an aryl group.

10. The composition of claim 1 wherein the inorganic filler is a metal, a metal oxide, a metal hydroxide, metal sulfide, a metal carbonate, a metal sulfate, a metal silicate (excluding glass), a metal borate, potassium titanate, carbon or graphite.

11. The composition of claim 1 wherein the organic filler is an aromatic polyester fiber, an aromatic polyamide fiber or an aromatic polyimide fiber.

12. The composition of claim 1 comprising 100 parts by weight of the acetal resin (A), 0.1 to 20 parts by weight of the component (B), 0.01 to 20 parts by weight of the component (C) and 0.1 to 120 parts of the component (D).

13. The composition of claim 2 wherein the acetal resin (A) is composed substantially of oxymethylene units.

14. The composition of claim 2 wherein the acetal resin (A) is composed substantially of oxymethylene units and oxyalkylene units having at least 2 carbon atoms.

15. The composition of claim 1 wherein the inorganic filler is a metal silicate, excluding glass.

* * * * *

UNITED STATES PATENT AND TRADEMARK OFFICE
CERTIFICATE OF CORRECTION

PATENT NO. : 4,506,053
DATED : March 19, 1985
INVENTOR(S) : Masanori SAKURAI, Junichi MIYAWAKI and Toshikazu UMEMURA It is certified that error appears in the above—identified patent and that said Letters Patent is hereby corrected as shown below:

Column 2, line 51, change "$R_1$-O-C=N)m" to --$R_1$(O-C=N)m--.

Claim 5, line 4 of the claim (line 63 of Column 11), change $R_1$-O-C=N)m" to --$R_1$(O-C=N)m--.

Signed and Sealed this

Twelfth Day of November 1985

[SEAL]

Attest:

DONALD J. QUIGG

Attesting Officer

Commissioner of Patents and Trademarks